United States Patent [19]

Udagawa

[11] Patent Number: 5,435,575
[45] Date of Patent: Jul. 25, 1995

[54] STEEL LAMINATE GASKET

[75] Inventor: Tsunekazu Udagawa, Ichikawa, Japan

[73] Assignee: Ishikawa Gasket Co., Ltd., Tokyo, Japan

[21] Appl. No.: 712,898

[22] Filed: Jun. 11, 1991

Related U.S. Application Data

[63] Continuation-in-part of Ser. No. 449,216, Dec. 12, 1989, which is a continuation-in-part of Ser. No. 231,303, Aug. 11, 1988, Pat. No. 4,898,396.

[51] Int. Cl.⁶ ............................................. F16J 15/10
[52] U.S. Cl. .................................. 277/235 B; 277/180
[58] Field of Search ............... 277/235 B, 235 R, 180, 277/236

[56] References Cited

U.S. PATENT DOCUMENTS

| | | |
|---|---|---|
| 3,759,585 | 7/1988 | Udagawa . |
| 4,739,999 | 4/1988 | Ishii et al. . |
| 4,834,399 | 5/1989 | Udagawa et al. ............... 277/235 B |
| 4,867,462 | 9/1989 | Udagawa ........................ 277/235 B |
| 4,896,891 | 1/1990 | Udagawa ........................ 277/235 B |
| 4,898,396 | 2/1990 | Udagawa ........................ 277/235 B |

*Primary Examiner*—Daniel G. DePumpo
*Attorney, Agent, or Firm*—Kanesaka & Takeuchi

[57] ABSTRACT

A steel laminate gasket comprises first, second and third plates. The first plate includes a base portion, a curved portion around a cylinder bore, and a flange extending away from the curved portion. The third plate includes a hole and an edge portion around the hole, which is located above the flange. The second plate is situated between the first and third plates away from the cylinder bore, and sealing layers are formed on both surfaces of the second plate to seal between the plates. A resilient seal ring is situated above the edge portion near the curved portion to resiliently seal around the cylinder bore when the gasket is tightened.

6 Claims, 1 Drawing Sheet

STEEL LAMINATE GASKET

CROSS REFERENCE TO RELATED APPLICATION

This is a continuation in part application of Ser. No. 449,216, filed on Dec. 12, 1989, which is, in turn, a continuation in part application of Ser. No. 231,303, filed on Aug. 11, 1988, now patented as U.S. Pat. No. 4,898,396.

BACKGROUND OF THE INVENTION AND RELATED ART STATEMENT

The present invention relates to a steel laminate gasket for an internal combustion engine to securely seal around cylinder holes and through holes.

An internal combustion engine is provided with a plurality of cylinder holes and other holes, such as holes for bolt, water, oil and push rod. When an engine is actuated, high pressure and high temperature are applied to the cylinder holes due to combustion of a fuel, while relatively low pressure and low temperature are applied to the other holes.

In order to properly seal between two engine parts of an engine, a gasket is situated between the two engine parts, such as a cylinder head and a cylinder block, and is tightened so that areas around the cylinder holes as well as the other holes are securely sealed. However, since the sealing conditions around the cylinder holes and other holes are different as explained above, it is not easy to securely seal around all the holes.

It has been known that beads are formed around the cylinder holes and other holes to securely seal around the holes. However, in case the beads are simply formed, sealing can not be perfectly made. Namely, while an engine is actuated, leakage may happen around the cylinder holes and other holes.

In some cases, seal rings may be separately attached around holes for water and oil. However, since the seal rings are separately prepared and installed in the gasket, it requires additional cost. Therefore, this method is not practical.

Accordingly, one object of the present invention is to provide a steel laminate gasket which can seal properly around all kinds of holes in an engine.

Another object of the present invention is to provide a steel laminate gasket as stated above, which can be manufactured easily and economically.

Further objects and advantages of the present invention will be apparent from the following description of the invention.

SUMMARY OF THE INVENTION

In accordance with the present invention, a steel laminate gasket is installed in an internal combustion engine having at least one cylinder bore therein. The gasket basically comprises first, second and third plates.

The first plate includes a base portion extending substantially throughout an entire area of the engine, and at least one first hole formed in the base portion, which corresponds to the cylinder bore of the engine. The first plate further includes a curved portion to define the first hole, and a flange extending away from the first hole. The base portion, the curved portion and the flange are integrally formed together.

The second plate is situated under the base portion of the first plate, and includes at least one second hole. The second hole is larger than the flange so that the second plate does not pile over the flange when the gasket is assembled.

The third plate is situated under the second plate. The third plate includes at least one third hole larger than the cylinder bore of the engine, and an edge portion around the third hole. The edge portion is located between the flange and the base portion of the first plate when the gasket is assembled.

The gasket further includes a resilient seal ring situated between the base portion and the edge portion near the curved portion. When the gasket is tightened, the seal ring provides resiliency for sealing around the cylinder bore.

Sealing layers are attached to outer surfaces of the second plate to prevent fluid from entering between the plates. Since the second plate does not extend adjacent the cylinder bore, the sealing layers may be made of a material weak against heat but effective against fluid, which are formed on the entire outer surfaces of the second plate.

Generally, the engine further includes at least one fluid hole. The first, second and third plates, therefore, include holes corresponding to the fluid hole of the engine. Sealing means is formed on at least one of the first, second and third plates for sealing around the fluid hole.

The sealing means may be a bead formed on the second plate, or may be beads formed on the first and third plates.

DETAILED DESCRIPTION OF PREFERRED EMBODIMENTS

Figure 1:
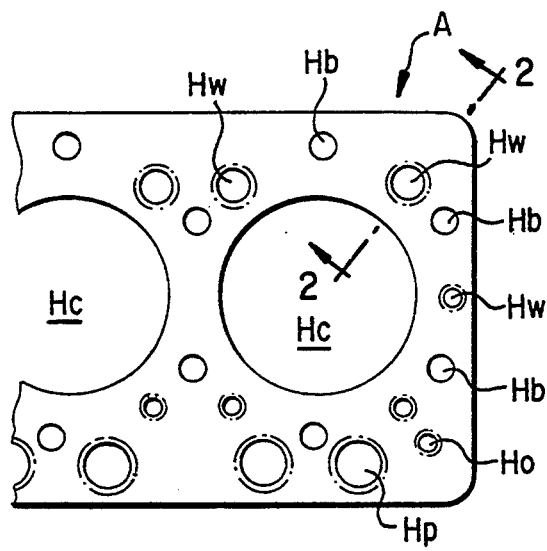
FIG. 1 is a partial plan view of a first embodiment of a steel laminate gasket of the present invention.
Figure 2:
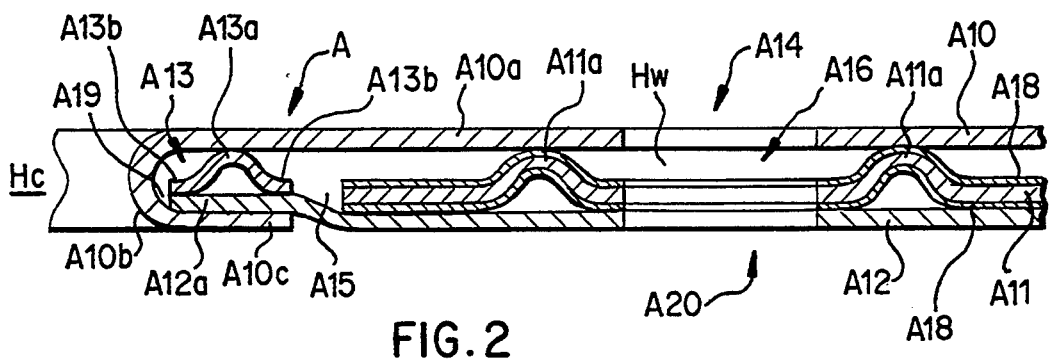
FIG. 2 is an enlarged section view taken along line 2—2 in FIG. 1.

Referring to FIGS. 1 and 2, a first embodiment A of a steel laminate gasket of the present invention is shown. The gasket A is a cylinder head gasket and is provided with cylinder bores Hc, bolt holes Hb, water holes Hw, oil holes Ho and push rod holes Hp, as in the conventional gasket. The areas around the water holes Hw, oil holes Ho and push rod holes Hp are sealed in the same manner. For convenience, the cross section of the water hole Hw and cylinder bore Hc is shown in FIG. 2.

As shown in FIG. 2, the gasket A comprises an upper plate A10, a lower plate A12 and a middle plate A11 situated between the upper and lower plates A10, A12. A seal ring A13 is situated inside the gasket A near the cylinder bore Hc.

The upper plate A10 includes a base portion A10a extending substantially throughout the entire area of the gasket. A hole A14 corresponding to the water hole Hw is formed in the base portion A10a. Also, the upper plate A10 includes a curved portion A10b to define the cylinder bore Hc and a flange A10c.

The middle plate A11 includes a hole A15 larger than the cylinder bore Hc, and a hole A16 for the water hole Hw. The middle plate A11 is also provided with a bead A11a around the hole A16.

Coatings A18 are formed for covering the entire areas of the upper and lower surfaces of the middle plate A11. The coatings A18 are made of soft materials to provide resiliency and seal between the plates. Gum, such as NBR gum and silicone gum is preferred, but soft resin may be used. The thickness of the coating A18 is 5–100 micra, preferably 10–50 micra.

The lower plate A12 includes a hole A19 and an edge portion A12a around the hole A19. The edge portion A12a is located above the flange A10c. The lower plate A12 also includes a hole A20 for the water hole Hw.

The seal ring A13 includes a bead A13a and two side portion A13b. The seal ring A13 is situated above the edge portion A12a under the base portion A10a.

When the gasket A is situated between a cylinder head and a cylinder block (both not shown) and is tightened, the bead A13a is compressed and provides surface pressure around the cylinder bore Hc, while the bead A11a provides surface pressure around the water hole Hw. As a result, the areas around the cylinder bores Hc and water holes Hw are sealed effectively.

In the present invention, it is important that the coating A18 is made of a soft material. Accordingly, the soft material seals properly between the plates to thereby prevent leakage of fluid from the water hole Hw. Also, it is important that the coating is formed on the middle plate A11, which does not extend adjacent the cylinder bore Hc. This is because if the coating is exposed to high temperature, creep relaxation of the soft material occurs to thereby cause leakage around the cylinder bore Hc and water hole Hw.

Namely, an effective coating material around the water hole Hw is weak against heat. Therefore, the coatings A18 are formed on the middle plate which does not extend near the cylinder bore Hc.

Generally, small scratches are formed on outer surfaces of a cylinder head and a cylinder block when manufacturing the same. In order to fill up the small scratches, coatings which are strong against heat may be formed on outer surfaces of the gasket. Therefore, in the present invention, thin coatings may be formed on the outer surfaces of the upper and lower plates A10, A12, which contact the cylinder head and the cylinder block.

Figure 3:
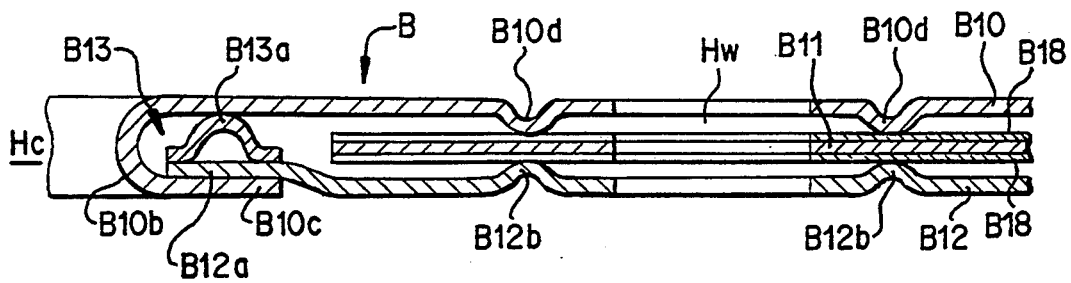
FIG. 3 is a section view, similar to FIG. 2, of a second embodiment of a steel laminate gasket of the present invention.

FIG. 3 shows a second embodiment B of a steel laminate gasket of the invention. The gasket B comprises an upper plate B10 with a curved portion B10b and a flange B10c, a middle plate B11 with coatings B18, a lower plate B12 with an edge portion B12a, and a seal ring B13 with a bead B13a, similar to the gasket A.

In the gasket B, the upper plate B10 includes a bead B10d around the water hole Hw, and the lower plate B12 includes a bead B12b around the water hole Hw. The beads B10d, B12b seal around the water hole when the gasket is tightened. The gasket B operates as in the gasket A.

In accordance with the present invention, the seal ring provides surface pressure around the cylinder bore for sealing therearound, and the coating material which is weak against heat but effective to seal around fluid holes is provided on the middle plate located away from a cylinder bore. Therefore, areas around the cylinder bore and fluid hole are effectively sealed.

While the invention has been explained with reference to the specific embodiments of the invention, the explanation is illustrative and the invention is limited only by the appended claims.

What is claimed is:

1. A steel laminate gasket for an internal combustion engine having at least one cylinder bore therein, comprising:
   a first plate having a base portion extending substantially throughout an entire area of the engine, at least one first hole formed in the base portion, said first hole corresponding to the cylinder bore of the engine, a curved portion integrally formed with the base portion, said curved portion extending substantially transversely to the base portion to define the first hole, and a flange integrally formed with the curved portion to extend in a direction away from the first hole,
   a second plate situated under the base portion of the first plate and having at least one second hole, said second hole being larger than the flange so that the second plate does not extend near the cylinder bore nor laminate the flange when the gasket is assembled,
   a third plate situated under the second plate and having at least one third hole larger than the cylinder bore of the engine, and an edge portion situated around the third hole, said edge portion being directly placed on the flange and situated under the base portion of the first plate without laminating the second plate,
   a resilient seal ring situated between the base portion and the edge portion of the third plate located above the flange, said seal ring being located adjacent to the curved portion and being formed of a bead and two side portions at both sides of the bead so that when the gasket is tightened, the seal ring provides resiliency for sealing around the cylinder bore between two engine parts and for sealing between the edge portion of the third plate and the flange of the first plate, and
   seal coatings formed on outer surfaces of the second plate, said seal coatings being formed of a soft material to prevent fluid from entering between the plates without being affected by heat from the cylinder bore,
   wherein a portion of the gasket outside the flange relative to the cylinder bore is formed of a part of the first plate, the second plate and a part of the third plate, while a portion of the gasket immediately outside the cylinder bore is formed of a part of the base portion and the flange of the first plate, the edge portion of the third plate and the resilient seal ring to thereby provide high resilient surface pressure immediately outside the cylinder bore.

2. A steel laminate gasket according to claim 1, wherein said engine further includes at least one fluid hole, said first, second and third plates having holes corresponding to the fluid hole of the engine, and sealing means being formed on at least one of the first, second and third plates for sealing around the fluid hole.

3. A steel laminate gasket according to claim 2 wherein said sealing means is a bead formed on the second plate.

4. A steel laminate gasket according to claim 2, wherein said sealing means is beads formed on the first and third plates.

5. A steel laminate gasket according to claim 1, wherein said gasket consists essentially of the first plate, the second plate with the seal coatings, the third plate, and the resilient seal ring.

6. A steel laminate gasket according to claim 5, wherein said two side portions of the seal ring are completely located on the flange through the edge portion of the third plate.

* * * * *